(12) United States Patent
Hsiao

(10) Patent No.: US 6,874,555 B1
(45) Date of Patent: Apr. 5, 2005

(54) TRANSMISSION DEVICE OF LAMINATING MACHINE

(75) Inventor: Chin-Tsung Hsiao, Taipei Hsien (TW)

(73) Assignee: Tex Year Industries Inc., Taipei Hsien (TW)

( * ) Notice: Subject to any disclaimer, the term of this patent is extended or adjusted under 35 U.S.C. 154(b) by 0 days.

(21) Appl. No.: 10/823,573

(22) Filed: Apr. 14, 2004

(51) Int. Cl.⁷ .............................................. B32B 31/00
(52) U.S. Cl. ..................................... 156/555; 156/582
(58) Field of Search ............................... 156/555, 556, 156/580, 582, 583.1; 100/327, 155 R, 160, 176; 219/244; 425/368

(56) References Cited

U.S. PATENT DOCUMENTS

| | | | | |
|---|---|---|---|---|
| 4,302,276 A | * | 11/1981 | Schulze ........................ | 156/553 |
| 4,387,000 A | * | 6/1983 | Tancredi ....................... | 156/495 |
| 5,232,538 A | * | 8/1993 | Liu .............................. | 156/359 |
| 5,728,257 A | * | 3/1998 | Lee .............................. | 156/555 |
| 5,853,531 A | * | 12/1998 | Murphy et al. .............. | 156/555 |
| 6,427,744 B2 | * | 8/2002 | Seki et al. .................... | 156/353 |
| 6,550,516 B2 | * | 4/2003 | Moriguchi et al. ........... | 156/555 |

* cited by examiner

*Primary Examiner*—James Sells
(74) *Attorney, Agent, or Firm*—Birch, Stewart, Kolasch & Birch, LLP

(57) ABSTRACT

A transmission device of laminating machine comprises a motor interactively driven by an inner gear and a outer gear; an axis for fixing the position of an upper rolling wheel and a lower rolling wheel respectively and passing a document through; a board installed at the inner side of the motor, a positioning hole and a guiding slice disposed on the board, such that the guiding slice is coupled to the external side of the guiding block and the positioning axis is inserted into the positioning hole; a stem extended from the board; and an elastic part installed between the stem and the side board. As long as the stem is pressed downward to rotate the board, the motor and the outer gear will be separated with each other to stop the transmission.

5 Claims, 6 Drawing Sheets

TRANSMISSION DEVICE OF LAMINATING MACHINE

BACKGROUND OF THE INVENTION

1. Field of the Invention

This invention relates generally to a transmission device and, more specifically, to a transmission device of laminating machine that is controlled by a mechanism to release a document.

2. Description of the Prior Art

Heretofore, it is known that laminating machines apply heat to bind two laminating sheets between two rolling wheels and an inserted document into one body, the inserted document is sealed inside completely. The transmission device of the laminating machine as shown in FIG. 1 comprises a motor 11 for driving a lower gear 13 through an outer gear 12 and the lower gear 13 driving an upper gear 14; the axis of the upper and lower gear 14, 13 fixed onto an upper rolling wheel 16 and a lower rolling wheel 15 respectively; a document 17 passing between the upper and lower rolling wheels 16, 15 and the motor 11 driving the upper and lower rolling wheels 16, 15. Sometimes, the document 17 to be laminated along with the laminating sheets are entered between the upper and lower rolling wheels 16, 15; if the document 17 is not fed properly or affected by the rolling wheels 15, 16, wrinkles might occur. In the structure of the known laminating machine, users cannot pull the document out during the heating process; even if turning the power off, the document is still clipped between the rolling wheels; if users pull the document out by force, the surface of document will not be smooth, and the remedy that follows is tedious. The fundamental cause of the problem resides on the synchronization between the motor and the rolling wheels; if the motor stops, the rolling wheels will be stuck. As a result, the document can only be pulled out by force.

SUMMARY OF THE INVENTION

It is therefore a primary object of the invention to provide a transmission device of laminating machine that applies a special mechanical design to have the power disconnected anytime during a transmission, the gear sets no longer connect with each other, a separation mechanism is installed to control the transmission on and off even if the power source is still turning, the transmission of the rolling wheels of the upper and lower gears can be terminated anytime, so that users can pull the document out instantly from the laminating machine; such scheme not only protects document from being wasted but also lets the document be laminated after the adjustment. The laminating machine can return to the original state in a short period of time.

In order to achieve the objective set forth, a transmission device of laminating machine in accordance with the present invention comprises a motor that drives a lower gear through an outer gear, the lower gear drives an upper gear, the axis of the upper and lower gears are fixed onto an upper and a lower rolling wheel respectively; and the document passes between the upper and lower rolling wheels. A board is installed near the motor, the outer gear is external to the board; the upper and lower rolling wheels position externally to a side board. A positioning axis and a curve guiding block with the positioning hole as center are installed on the surface of the side board, a positioning hole and a guiding slice are on the board; the guiding slice is installed outside and adjacent to the guiding block, the positioning axis is inserted into the positioning hole. A stem is extended from the board; an elastic part is installed between the stem and the side board. Users can press the stem down to rotate board turn about the positioning hole as the enter of rotation to separate the motor with the outer gear, and thus stop the rotation.

BRIEF DESCRIPTION OF THE DRAWINGS

The accomplishment of the above-mentioned object of the present invention will become apparent from the following description and its accompanying drawings which disclose an illustrative embodiment of the present invention, and are as follows.

DESCRIPTION OF THE PREFERRED EMBODIMENT

Figure 1:
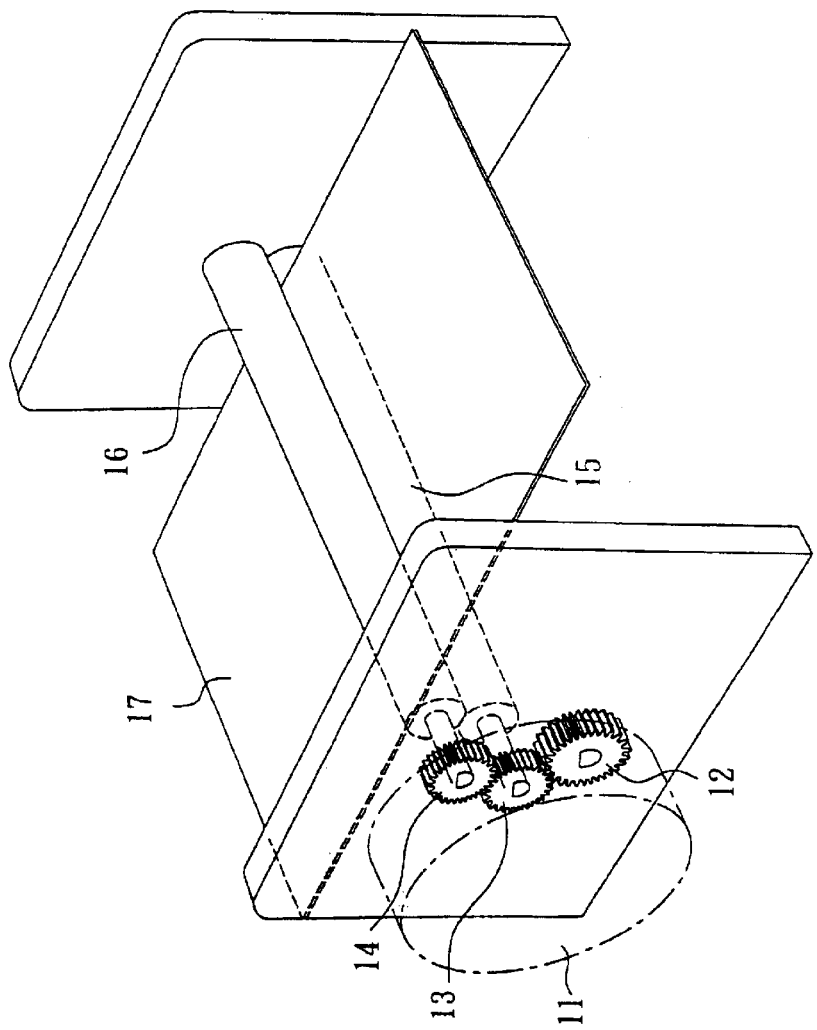
FIG. 1 is a perspective view of the prior a rt.
Figure 2:
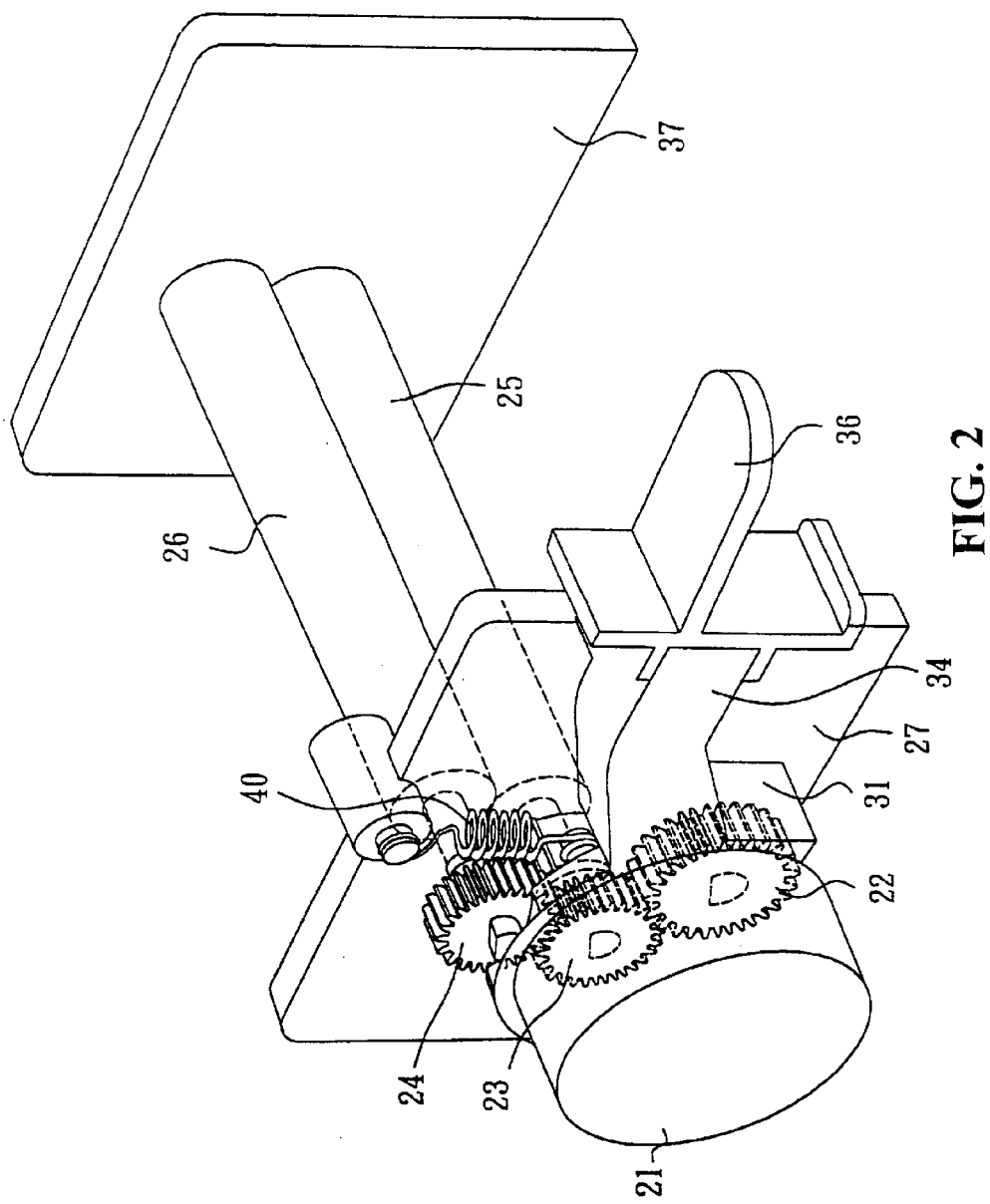
FIG. 2 is a perspective view of the pr es ent invention.

Referring to FIG. 2 to FIG. 6, the present invention comprises a motor 21 on the outmost side; the motor 21 drives a lower gear 23 through an outer gear 22; the lower gear 23 drives an upper gear 24; the upper and lower gears 24, 23 are installed in line; the axis of the upper and lower gears 24, 23 are fixed onto an upper rolling wheel 26 and a lower rolling wheel 25 respectively; a document (not shown in FIG. 2, refer to FIG. 1) passes between the upper and lower rolling wheels 26, 25; a board 31 is installed near the motor 21, the outer gear 22 is external to the board 31; the upper and lower rolling wheels 26, 25 position externally to a side board 27, another side board 37 locates on the other side of the side board 27; and the upper and lower rolling wheels 26, 25 are installed between two side boards 27, 37.

Figure 3:
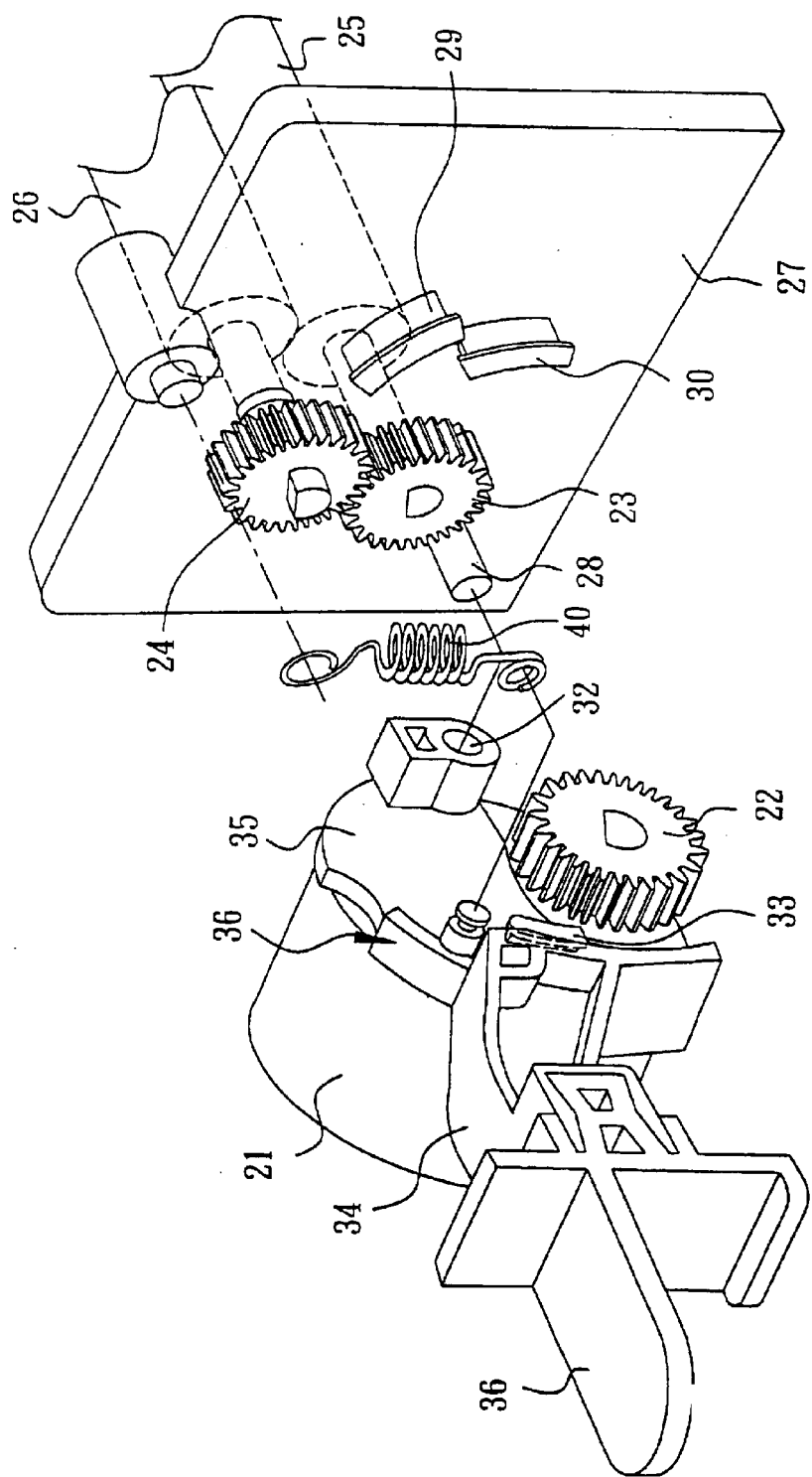
FIG. 3 is a cross-sectional view of the present invention.
Figure 4:
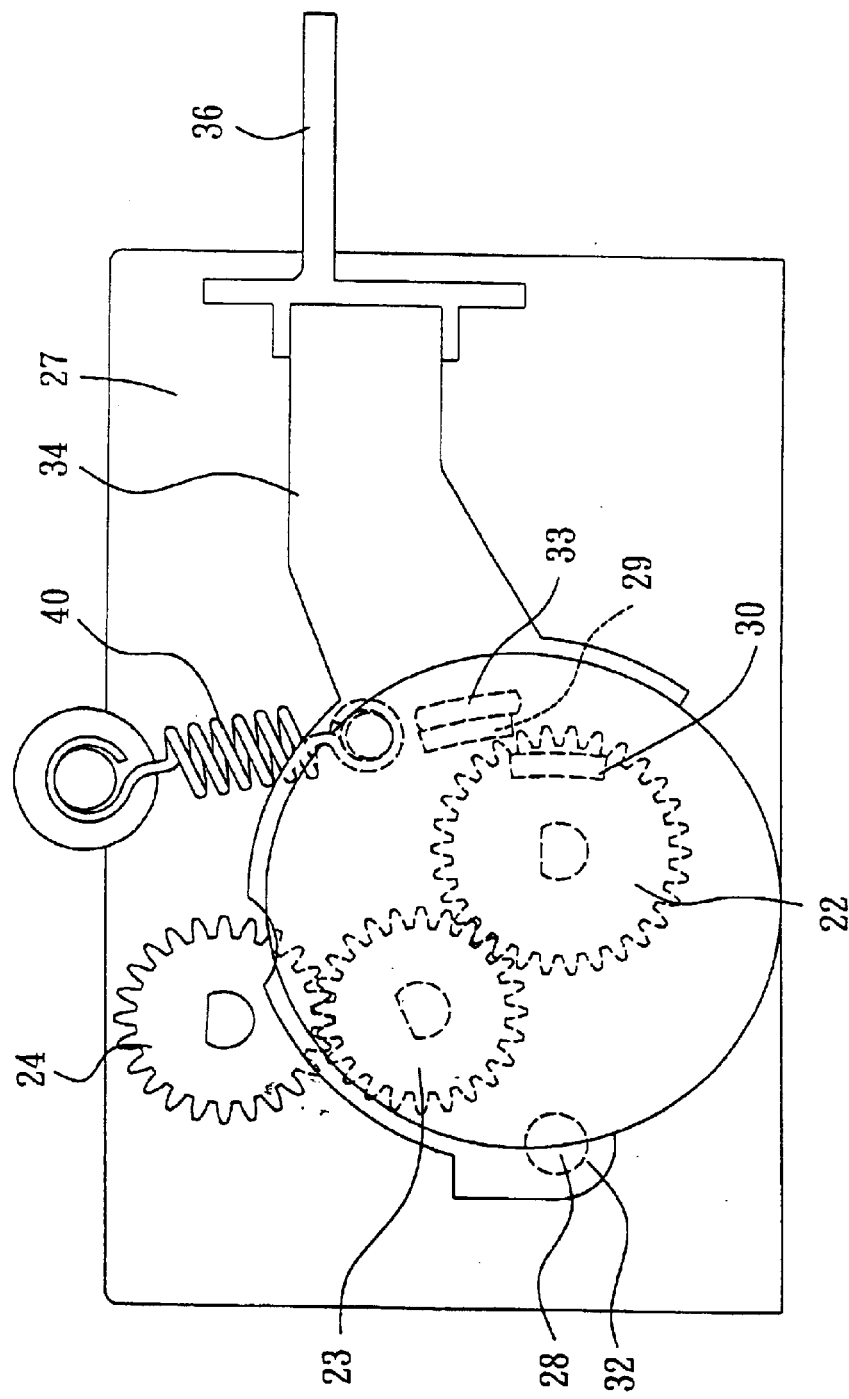
FIG. 4 is a side view of the present invention.
Figure 5:
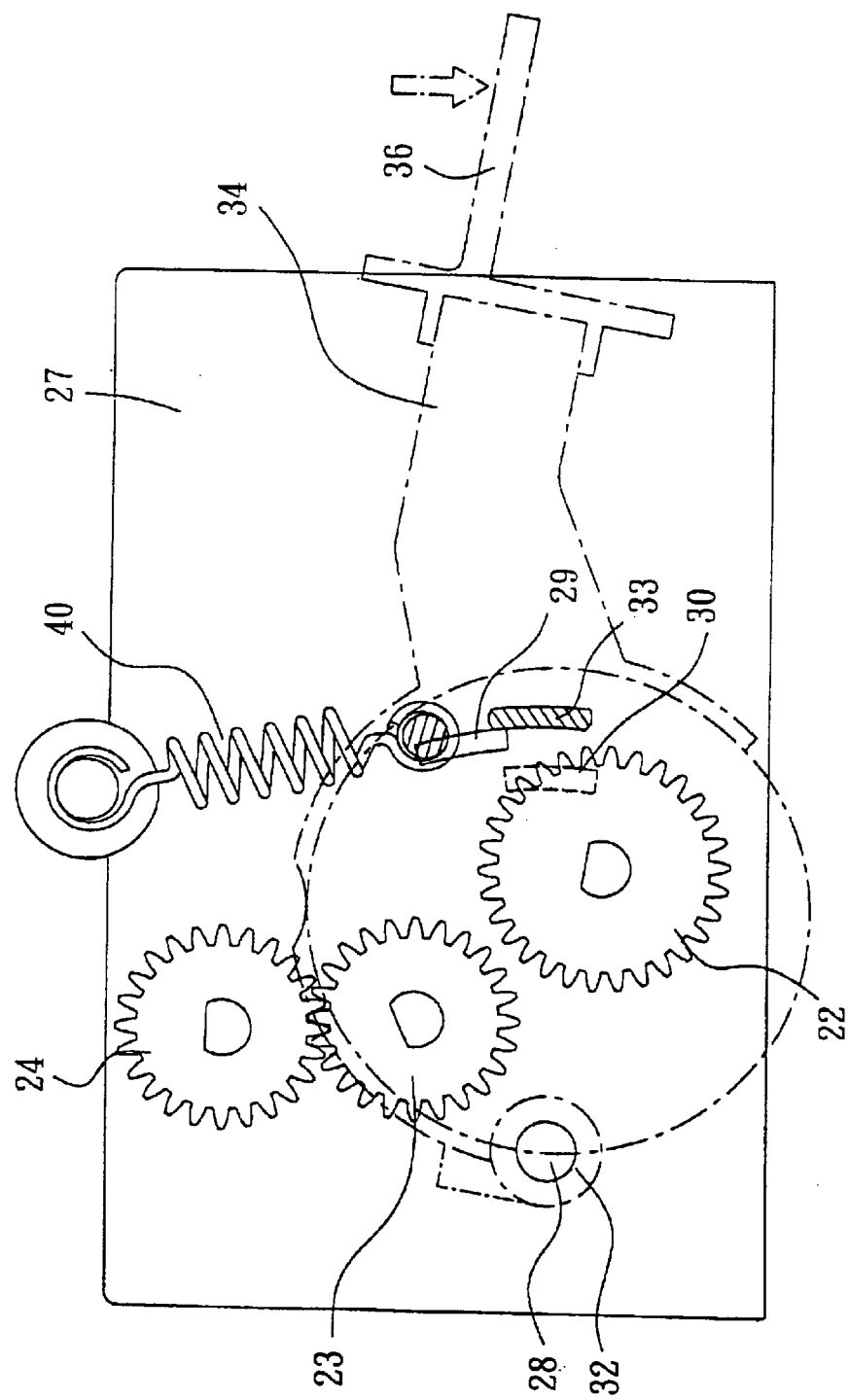
FIG. 5 is a side application view of the present invention.
Figure 6:
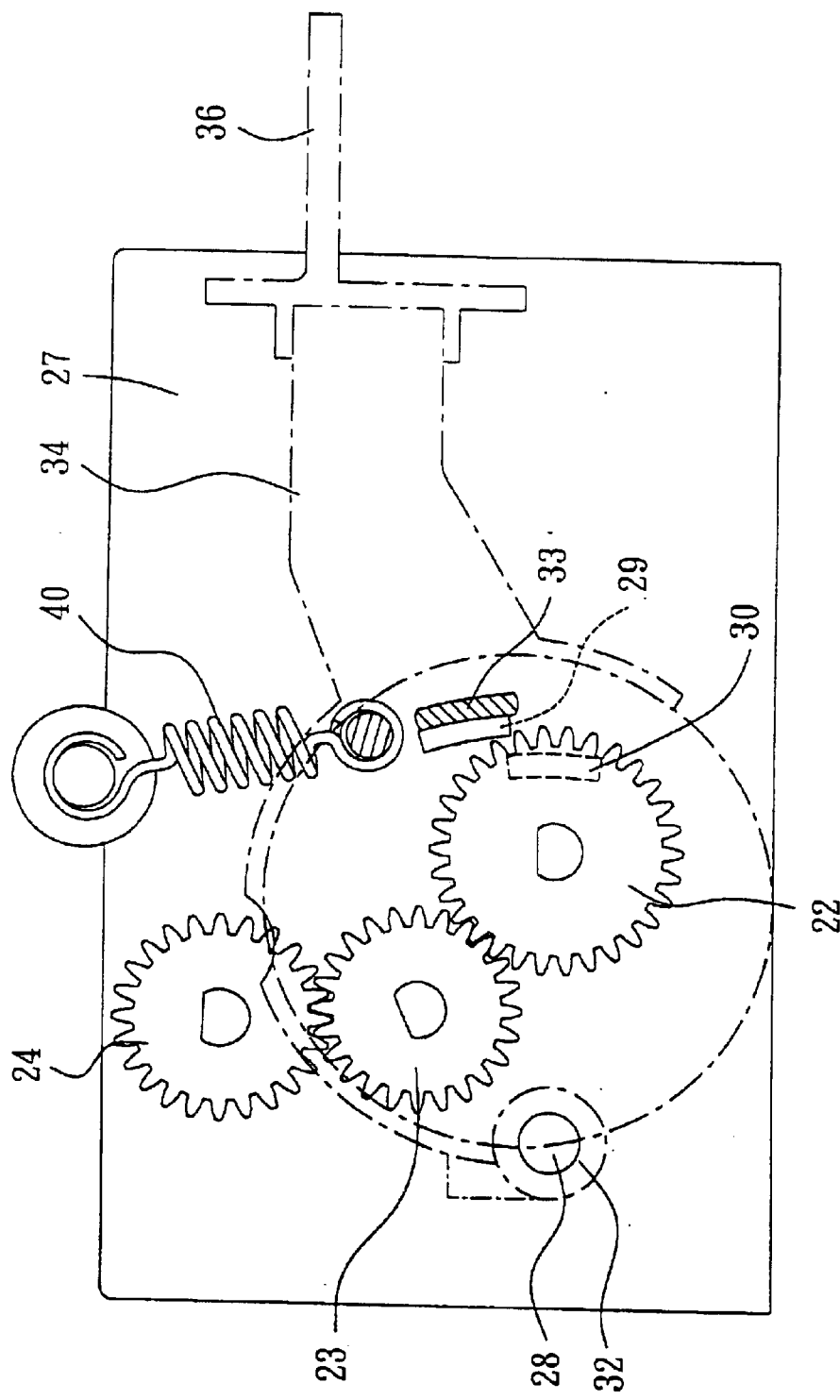
FIG. 6 is a side view without a further embodiment of the present invention.

A positioning axis 28 and a guiding block 29 are installed on the surface of the side board 27, a positioning hole 32 and a guiding slice 33 are on the board 31; the guiding slice 33 is installed outside and adjacent to the guiding block 29, the positioning axis 28 is inserted to the positioning hole 32; a stem 34 is extended from the board 31, the width of the stem 34 is wider than the board 31 for the function of the holder 35 of the board 31 is to fix the motor 21; a space is formed between the holder 35 and the side board 27 for accommodating the gears 22, 23, 24. The stem 34 is extended from the holder 35 with a width equal to the distance between the holder 35 and the side board 27 and extended to a side of the side board 27 in order to hold the stem 34 more conveniently, a pressing part 36 is installed and connected to the stem 34, the pressing part 36 is in a cross shape viewed from both sides; users can press the pressing part 36 to move the board 31; an elastic part 40 is on top of the stem 34 (between the board 31 and the stem 34) and the top of the side board 27 as shown in FIG. 4; the elastic part 40 is a spring for pulling the board 31; when the pressing part 36 is pressed downward as shown in FIG. 5, the board 31 turns around the positioning hole 32 and drives the motor 21 to separate the outer gear 22 with the lower gear 23, wherein the lower gear 23 will not turn for the guiding block 29 and the positioning axis are in a curve shape and co-axis as shown in FIG. 6; the elastic part 40 pulls the motor 21 and the board 31; the guiding slice 33 is also in a curve shape and installed on the stem 34; such design can have the guiding slice 33 move along the outer surface of the guiding block 29. Referring to FIG. 3, a positioning block 30 corresponding to the position of the outer gear 22 is on the side board 27 for assembly positioning and controlling the outer gear 22 to be accurately connected to the lower gear 23. In design, the same consideration for the upper gear 24 should be taken for the outer gear 22.

Based on the structure described above, the present invention applies a concentric turning and elastic suspension mechanism to maintain power output, users can remove the transmission by pressing to release the interconnection among the gears and let the upper gear, lower gear, upper rolling wheel, and lower rolling wheel move freely; users can pull the document out from the upper and lower rolling wheels with a minimum effort; after the remedy is taken, the document can be placed back and the transmission restored without turning off the power.

While a preferred embodiment of the invention has been shown and described in detail, it will be readily understood and appreciated that numerous omissions, changes and additions may be made without departing from the spirit and scope of the invention.

What is claimed is:

1. A transmission device of laminating machine comprising:

a side board with a positioning axis and a guiding block installed on the surface, and said positioning axis being installed on the position corresponding to said guiding block, and two rolling wheels being connected to a pair of upper and lower gears which are connected to said side board, and said upper and lower gears being disposed on the outer side of said side board;

a board, located external to said side board, and a positioning hole and a guiding slice being disposed on said board toward said side board, and said guiding slice being installed outside and adjacent to said guiding block, and said positioning axis being inserted to said positioning hole, and a stem being extended from said board;

a motor, mounted on one side of said board;

an outer gear connected external to said board and driven by said motor, and said outer gear being connected to said lower gear and driving said upper gear; and an elastic part with its top connected to said side board and its bottom connected to said board, when said stem is pressed down, said board rotates about said positioning hole and drives said motor to separate said outer gear with said lower gear and stop the rotation of said lower gear, and said elastic part pulling said board back.

2. The transmission device of laminating machine recited in claim 1, wherein said elastic part is a spring.

3. The transmission device of laminating machine recited in claim 1, wherein said guiding block is in a curve shape.

4. The transmission device of laminating machine recited in claim 1, wherein said guiding slice is in a curve shape.

5. The transmission device of laminating machine recited in claim 1, wherein a positioning block corresponding to the position of said outer gear is disposed on said side board.

* * * * *